April 7, 1964 M. R. SELBERT 3,127,832

SMALL, READILY PORTABLE CHECK OR DOCUMENT PROTECTOR

Filed June 4, 1962

INVENTOR.
MAURICE R. SELBERT 3,127,832

SMALL, READILY PORTABLE CHECK OR DOCUMENT PROTECTOR

Maurice R. Seibert, 5901 N. Figueroa St., Los Angeles 42, Calif.
Filed June 4, 1962, Ser. No. 199,914
6 Claims. (Cl. 101—24)

The check protector of the present invention comprises an extremely small device which may be carried by a conventional mechanical pen or pencil or which may comprise a small independent unit capable of being readily carried around in a person's pocket. The check protector is normally inoperative and, in one version, is protected from accidental contact with any other object until such time as the user desires to use it for check-protecting purposes. When the device is to be used for check-protecting purposes, it is placed in engagement with any desired portion or region (or plurality thereof) of a check, such as those portions or regions bearing the amount of the check (which the person has previously written (or typed) upon the check) and/or those portions or regions bearing the maker's signature, after which the check is drawn through the device, which will act to effectively perforate and/or deform at least part of any such portion or region bearing such previously written (or typed) material, with the perforations and/or multiple deformations of the check being so distributed with respect to the previously typed or written material on the surface of the check (or any other document, for that matter) as to make it virtually impossible to subsequently alter said previously written or typed material without disturbing or tearing the multiple perforations or deformations in an obviously visibly observable manner which would make the alteration clearly apparent to any person viewing the document.

It should be noted that, while the device of the present invention may comprise a small personal portable check protector adapted to be individually carried, one preferred form of the invention is adapted to be carried by a writing instrument, such as a mechanical pen or pencil (or any similar structure) whereby to provide an ideal arrangement, since the device occupies virtually no extra space in a user's pocket and yet will be readily available for use at any time whenever the person carrying the device and the writing instrument desires to write and/or to sign and/or date a check or any other important document, etc.

It is an object of the present invention to provide a small, personal, portable check (or document) protector of either of the types referred to above—that is, of a type adapted to carried by a writing instrument or the like, or of the type adapted to be individually carried as a completely self-sufficient check (or document) protector unit and which, in either case, is of extremely small, simple, inexpensive, easy-to-operate, foolproof construction such as to be conducive to widespread use thereof.

It is a further object to provide a novel, small, personal, portable check (or document) protector of the type referred to above which includes check (or document) marking means of a type wherein the protective marking of any selected portion of a check (or document) is accomplished, at least in part, by mechanical alteration of at least certain parts of said portion of the check (or document) which is to be protected against subsequent alteration of previously written or previously typed material carried on the surface thereof.

It is a further object of the present invention to provide a novel, small, personal, portable check (or document) protector of the type referred to hereinbefore which includes check (or document) marking means of a type wherein the protective marking of any selected portion of a check or document is accomplished, at least in part, by the application of a visibly observable applicatory marking agent such as ink, or the like, to at least certain parts of said portion of the document which is to be protected against subsequent alteration of previously written or previously typed material carried on the surface thereof.

It is a further object of the present invention to provide a novel, small, personal, portable check (or document) protector combining the features set forth in the two preceding objects in a manner such that the marking of the area of a check or a document which is to be protected against subsequent alteration is accomplished both by mechanical deformation of certain parts thereof and by the application of a readily visibly observable marking agent such as ink, paint, or various pigmented materials.

Further objects are implicit in the detailed description which follows hereinafter (which is to be considered as exemplary of the invention, but not specifically limiting it) and said objects will be apparent to persons skilled in the art after careful study of the detailed description which follows hereinafter.

For the purpose of clarifying the nature of the present invention, several exemplary embodiments are illustrated in the figures of the attached drawing and are described in detail hereinbelow. It should be noted that the exemplary embodiments illustrated in the drawing and described hereinbelow are illustrative only of certain specific forms of the broad inventive concept of the present invention and are not to be construed as limiting the invention specifically to the precise forms shown in the drawing and described hereinbelow for illustrative purposes.

Actually, variations and/or modifications within the basic spirit, scope, and/or teachings of this disclosure are intended to be included and comprehended herein.

The figures of the accompanying drawing illustrate the invention in a first form (and a variation thereof) wherein it is carried by a writing instrument and in a second form wherein it is carried by a mounting member generally similar in configuration to a portion of the writing instrument of the first illustrated form of the invention. However, these versions are illustrative of the principles of the invention only and are not intended to limit the invention to the particular types of mountings illustrated. Actually, the device may be mounted on various other types of pens, pencils, and/or carriers.

Figures 1, 2, 3, 4, 5, 6, 7, 8:
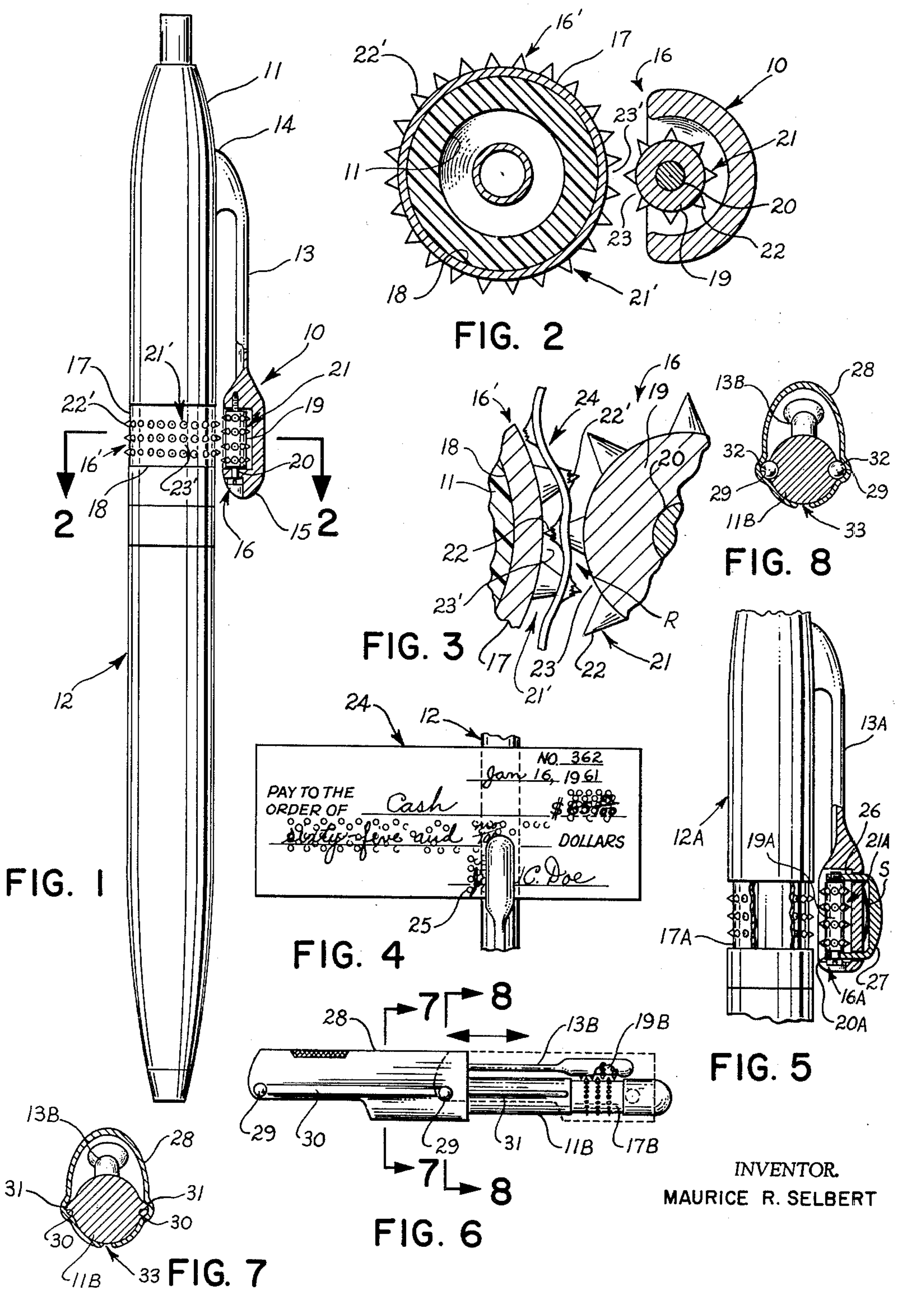
FIG. 1 is a side view, partly in elevation and partly in section, illustrating one exemplary embodiment of the invention.
FIG. 2 is an enlarged sectional view taken in the direction of the arrows 2—2 of FIG. 1.
FIG. 3 is an even larger scale view of the check-marking region or zone with the two rotary marking elements of FIG. 2 in engaged marking relationship with respect to a portion of a check or other document which is illustrated in fragmentary form only.
FIG. 4 is a reduced-size view illustrating the apparatus of the present invention (shown fragmentarily) in the act of applying protective markings to one or more desired strip-shaped regions of a check.

FIG. 5 is a fragmentary view of a slightly modified form of the invention adapted to normally maintain the marking element carried by the mounting clip of the writing instrument in a normally inoperative position so as to avoid contact thereof with any surface which the mounting clip may be slipped over when the writing instrument is being carried in a pocket, or the like, of the owner of the writing instrument.

FIG. 6 is a side elevational view illustrating another slight modification of the invention wherein it is carried by a mounting member which is similar to a portion of the writing instrument carrying the first form of the invention. The apparatus is shown in full lines with the cover in the leftwardly extended open position, while the normal closed position of the apparatus is shown in broken lines.

FIG. 7 is an enlarged, cross-sectional view taken along the plane, and in the direction, indicated by the arrows 7—7 of FIG. 6.

FIG. 8 is another enlarged cross-sectional view similar to FIG. 7 and taken in the same direction but on a different plane from FIG. 7, as indicated by the arrows 8—8 of FIG. 6.

In the exemplary form illustrated in FIGS. 1–4, the check protector device, indicated generally at 10, is shown as being carried by the barrel 11 of a writing instrument which may comprise a ball-point pen, mechanical pencil, conventional liquid-ink pen, or the like, which is indicated generally at 12.

The check-protecting apparatus, indicated generally at 10, comprises a resilient auxiliary member 13 fastened by an attachment portion, as indicated at 14, to the outside of the barrel 11 (which may be said to comprise a mounting base member). In the example illustrated in FIGS. 1–4, said resilient auxiliary member 13 comprises a conventional pen-mounting spring clip normally resiliently spaced outwardly slightly more than when in the check-engaging position best shown in FIG. 3.

The free or bottom end 15 of the spring clip or resilient member 13 is provided with a first rotary marking means portion, indicated generally at 16, normally positioned in closely adjacent but slightly spaced opposition to a second rotary marking means portion, indicated generally at 16', and, in the specific example illustrated, comprising the rotary sleeve 17 rotatably carried in a corresponding annular recess 18 in the exterior of the barrel 11.

It should be noted that the first rotary marking means portion, indicated generally at 16 and the second rotary marking means portion, indicated generally at 16', in the specific exemplary form of the invention shown in FIGS. 1–4, together comprise one particular and non-limiting form of what may be broadly referred to as rotary marking means for effectively marking a desired strip or region of a document for protection against subsequent alteration of said strip or region by making such subsequent alteration clearly visibly observable.

In other words, it should be clearly noted that it is not necessary in all cases that said broadly referred to rotary marking means consist of first and second portions, as indicated generally at 16 and 16' in the specific exemplary version of the invention illustrated in FIGS. 1–4. This comprises one exemplary and highly effective arrangement, but it should be clearly noted that said rotary marking means may be modified very substantially and, in certain forms of the invention, may consist of only one rotary marking element rather than two as indicated in FIGS. 1–4.

Furthermore, in certain modifications wherein only one such rotary marking element is employed, it may be positioned on either side of the apparatus. Also, in certain forms of the invention wherein only one such rotary marking element actually marks a portion of a document which is to be protected, another rotary element may be positioned on the opposite side of said portion of the document although not comprising a marking element. Said second rotary element may merely facilitate movement of the document relative to the first mentioned rotary element, which is actually the marking element, and may also provide back-up support for the document to maintain it close to the first mentioned rotary element, which actually comprises the marking element, so that the document will be effectively marked.

The first rotary marking means portion 16, in the example illustrated comprises a cylindrical marking member 19 rotatably mounted on the effective shaft portion 20, with the exterior of the cylindrical marking member 19 being provided with a first document-marking applicatory means portion 21 comprising a plurality of outwardly directed marking elements or points 22 adapted to cooperate with corresponding receiving portions 23' positioned between similar but offset oppositely directed points 22', of a second document-marking applicatory means portion, indicated generally at 21', carried by the adjacent rotary sleeve 17; said receiving portions 23' of the sleeve 17 being positioned for receiving or mating engagement with the outwardly directed points 22 of the rotary marking member 19 and the similar receiving portions 23 of the rotary marking member 19 being positioned for similar receiving or mating engagement with the outwardly directed points 22' carried by the rotary sleeve 17. Both of these receiving or mating relationships of the two sets of points 22 and 22' in the two corresponding receiving sets of apertures 23' and 23 occur during relative rolling engagement thereof along a strip of a document or check, such as that illustrated at 24 in FIGS. 3 and 5.

It should be noted that, while the arrangement shown in FIGS. 1–4 is a highly advantageous arrangement, the invention is not specifically limited to this arrangement only. Actually, various other arrangements including opposed sets of points and receiving portions or means, or a non-opposed set of points (usually with appropriate receiving portions or means on the opposite side of the document reception region) may be employed for the same general purpose as that described above.

In other words, the form of the invention shown in FIGS. 1–4 is exemplary only and is not to be construed as specifically limiting the marking means and the points thereof to the precise structural arrangement shown in FIGS. 1–4.

While one specific arrangement of points and recesses has been illustrated and described, it should be noted that the invention is not specifically so limited and various other projecting marking elements and corresponding receiving means may be employed in lieu of the specific arrangement illustrated and described above for exemplary purposes.

It should be noted that the resilient character of the spring clip 13 allows the normally slightly spaced relationship of the rotary marking member 19 and the cooperating rotary sleeve 17 to be effectively closed into a check-engaging position, such as that best shown in FIG. 3, by the mere application of digital pressure to any portion of the spring clip 13 after a document, such as the check illustrated at 24 in FIGS. 3 and 4, for example, has had a desired portion placed therebetween in what may be called the document reception region R. Subsequently, the check or document 24 may be laterally pulled between the marking roller 19 and sleeve 17 which will effectively oppositely rotate same along opposite surfaces of a strip-like ribbon of the check 24 in a manner such as to apply multiple perforations or indentations therealong, as indicated by the reference numeral 25 in FIG. 4. This will effectively modify any desired strip region of the document 24 upon which certain material has been previously typed or written in a manner such that any subsequent alteration will be very apparent.

It should be noted that, in certain forms of the invention, the sleeve 17 need not be provided with exterior recess means but may merely be of a sufficiently compressible, resilient, and/or elastomeric material as to allow the penetrating points 22 to be effectively received in a document-indenting manner.

The roller 19 and sleeve 17 may be made of any suitable material such as metal, plastic, or the like.

FIG. 5 illustrates a very slight modification of the invention wherein similar parts are indicated by similar reference numerals, followed by the letter "A," however. In this modification, the check-marking roller 19A is resiliently mounted in the end of the member 13A by the mounting bracket member 26 which is inwardly and outwardly slidably carried by the clip 13A and is biased outwardly by the spring "S" so as to normally be in an unengageable position but so as to be adapted to be moved into a document-engageable position upon the application of inwardly directed digital pressure to the digitally-engageable actuating means comprising the member 27. This modified form of the invention has the positive advantage of preventing the roller 19A from touching a person's pocket when the spring clip 13A is used for mounting the entire writing instrument 12A in such a pocket, or the like.

It should be noted that, in this modification of the invention or in other modifications wherein one or the other (or both) of the sets of marking elements is (or are) protected until check-marking use thereof, an applicatory check-marking agent, such as ink or the like, may also be employed and may be carried by either or both of the sets of check-marking elements.

FIGS. 6–8 illustrate a further slight modification of the invention and similar portions are indicated by similar reference numerals, followed by the letter "B," however. In this modification, the device is not carried by a pen barrel such as that shown at 11 in the first form of the invention, but is carried by a mounting member indicated at 11B which is functionally equivalent to the portion of the barrel 11 carrying the check protector in the first form of the invention. Thus, it will be seen that this modification may be extremely small and may very readily be carried in a person's pocket. Furthermore, it lends itself well to carrying suitable closure means, such as indicated generally at 28, for closing (or enclosing) substantially the entire device (or at least the operative check-marking portions thereof) during non-use storage periods.

In the specific example illustrated, the closure means, indicated generally at 28, comprises a slidable closure cover or cap provided with interiorly directed detent means at each end thereof which may take the form of half-round inwardly directed recesses such as indicated at 29 in FIG. 6. These detent means are interconnected by inwardly effectively concave guide groove or channel means 30. The mounting member 11B is provided with outwardly projecting longitudinal guide rail means 31 so positioned as to longitudinally guide the reciprocating cap member 28 between the normally closed position shown in broken lines at the right in FIG. 6, wherein the left detent means 29 is in engagement with a retaining ball 32, and a leftward extreme open position (shown in full or solid lines in FIG. 6) where the other or normally forward detent means 29 slides rearwardly along the guide rail means 31 into retained engagement with the retaining ball 32.

The longitudinal reciprocating movement of the cap 28 requires that slightly resilient springing action occur in order to effect disengagement of one detent means 29 from the longitudinally fixed retaining ball 32 and to subsequently allow engagement and later disengagement of the other detent means 29 therewith. This may be accomplished by the inherent resiliency of the materials or by providing a longitudinally split bottom portion 33 in the cap means 28 which will allow this action to occur.

The guide groove 39 slides with respect to the longitudinal guide rail means 31 and acts to keep the cover 28 and mounting member 11B in longitudinal alignment during opening and closing movement thereof.

The above described slidable engagement structure for slidably mounting the closure cover means or cap 28 with respect to the mounting base member 11B (and also the auxiliary member 13B carried thereby) is not to be construed in a limiting sense, but merely illustrates one particular type of slidable engagement means which may be said to comprise the longitudinal guide rail means 31, the guide groove means 30, the detent means 29, and the retaining ball means 32. However, it should be clearly understood that various other types of means for movably mounting a closure cover are intended to be included and comprehended within the broad scope of the present invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A small, readily portable check or document protector, comprising: a mounting base member provided with an auxiliary member having an attachment portion at one end effectively attaching said auxiliary member with respect to said mounting base member and having a free portion of said auxiliary member at the other end thereof positioned in lateral spaced opposition with respect to a lateral adjacent portion of said mounting base member, said free portion of said auxiliary member and said laterally adjacent portion of said mounting base member being effectively provided with rotary marking means defining a document reception region therebetween, said marking means being forcibly cooperable with a portion of a document drawn through said document reception region for forced relative rotary movement along similar areas of opposite surfaces of said portion of said document for visibly discernably spacedly perforately marking same in a manner such that subsequent alteration of at least one of said surfaces of said portion of said document will be visibly observable, said rotary marking means comprising a first rotary marking means portion rotatively carried by said free end of said auxiliary member and a second rotary marking means portion comprising an exterior sleeve rotatively carried by said laterally adjacent portion of said mounting base member, said first rotary marking means portion being provided with a first set of outwardly directed projecting first marking elements and said second rotary marking means portion being provided with a first set of correspondingly positioned first receiving portions adapted to receive said projecting first marking elements, said second rotary marking means portion being provided with a second set of outwardly projecting second marking elements and said first rotary marking means portion being provided with a second set of correspondingly positioned second receiving portions for the reception thereof, each set of projecting marking elements and the corresponding receiving portions being positioned to matingly engage as said portion of said document positioned therebetween is relatively moved with respect to said first and second rotary marking means as they roll along opposite surfaces thereof, each set of said outwardly projecting marking elements comprising a plurality of circumferentially and longitudinally spaced radially outwardly projecting points, each set of said receiving portions comprising spaces defined between the circumferentially and longitudinally spaced radially outwardly projecting points of the set of marking elements carried by the other one of said rotary marking means portions positioned on the opposite side of said document reception region from the set of projecting points adapted to be received thereby during a document marking and alteration-preventing operation.

2. A device as defined in claim 1, wherein said auxiliary member comprises a spring clip member and said attachment portion comprises a rigid attachment junction of one end thereof, in a cantilever manner, with respect to said mounting base member whereby to support said free portion of said auxiliary member and said first rotary marking means portion in said laterally spaced adjacent relationship with respect to said second rotary marking means portion rotatively carried by said laterally adjacent portion of said mounting base member.

3. A device as defined in claim 1, wherein said mounting base member comprises a portion of a writing instrument barrel.

4. A device as defined in claim 1, wherein said first rotary marking means portion is controllably laterally movably mounted by said free portion of said auxiliary member for inward and outward movement with respect to said free portion of said auxiliary member and is provided with biasing spring means normally biasing it outwardly toward an unengageable and inoperative outer position with respect to said free portion of said auxiliary member, said first rotary marking means portion being provided with digitally engageable actuating means adapted to be forcibly digitally pressed inwardly for forcibly moving said first rotary marking means portion inwardly with respect to said free portion of said auxiliary member against the action of said biasing spring means whereby to place said first rotary marking means in an engageable operative relationship projecting inwardly from said free portion of said auxiliary member toward said second rotary marking means portion for subsequent document marking and alteration-preventing operation thereof, said second rotary marking means portion comprising an annular recess means defined by said laterally adjacent portion of said mounting base member and an exterior sleeve rotatively mounted in said annular recess means with said set of outwardly projecting second marking elements of said second rotary marking means portion being carried thereby within said annular recess means for cooperation with said projecting first marking elements of said first rotary marking means portion when it is digitally forced inwardly by said digitally engageable actuating means into said inwardly projecting engageable operative relationship.

5. A device as defined in claim 1, including controllably operable closure cover means movably mounted with respect to said mounting base member and said auxiliary member for controllable movement into and out of enclosing relationship with respect to said marking means whereby to place it in an open operative position for a document marking and alteration-preventing operation and whereby to place it in inoperative, fully protected position for ready storage and portability during non-use periods.

6. A device as defined in claim 1, including controllably operable closure cover means movably mounted with respect to said mounting base member and said auxiliary member for controllable movement into and out of enclosing relationship with respect to said marking means whereby to place it in an open operative position for a document marking and alteration-preventing operation and whereby to place it in inoperative, fully protected position for ready storage and portability during non-use periods, said closure cover means and said mounting base member being provided with slidable engagement means relatively movably mounting said closure cover means and said mounting base member and the adjacent auxiliary member for relative longitudinal extending movement into said open and inoperative position and for relative longitudinal effective telescopic and retracting movement into said enclosed, inoperative storage position.

References Cited in the file of this patent

UNITED STATES PATENTS

| | | |
|---|---|---|
| 1,298,874 | Branson | Apr. 1, 1919 |
| 1,401,168 | McAllister | Dec. 27, 1921 |
| 1,435,869 | Mount | Nov. 14, 1922 |
| 1,509,876 | Ricerra | Sept. 30, 1924 |
| 1,644,668 | Clyne | Oct. 11, 1927 |
| 1,752,674 | Lappin | Apr. 1, 1930 |
| 1,981,662 | Pollock | Nov. 20, 1934 |